(12) United States Patent
Marupaduga et al.

(10) Patent No.: US 11,528,713 B2
(45) Date of Patent: Dec. 13, 2022

(54) DYNAMIC RAT AND LAYER MANAGEMENT ASSIGNMENT FOR DUAL-CAPABLE IOT DEVICES

(71) Applicant: T-Mobile Innovations LLC, Overland Park, KS (US)

(72) Inventors: Sreekar Marupaduga, Overland Park, KS (US); Roopesh Kumar Polaganga, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/229,060

(22) Filed: Apr. 13, 2021

(65) Prior Publication Data

US 2022/0330256 A1 Oct. 13, 2022

(51) Int. Cl.
*H04W 72/08* (2009.01)
*H04W 72/04* (2009.01)
*H04B 17/345* (2015.01)
*G16Y 10/75* (2020.01)
*H04W 88/06* (2009.01)

(52) U.S. Cl.
CPC ........ *H04W 72/082* (2013.01); *H04B 17/345* (2015.01); *H04W 72/048* (2013.01); *G16Y 10/75* (2020.01); *H04W 88/06* (2013.01)

(58) Field of Classification Search
CPC . H04W 72/048; H04W 72/08; H04W 72/082; H04W 72/085; H04W 72/12; H04W 72/1226; H04W 72/1231; H04W 88/02; H04W 88/06; H04B 17/309; H04B 17/345; G01Y 10/75
See application file for complete search history.

(56) References Cited

U.S. PATENT DOCUMENTS

| 5,926,501 | A | * | 7/1999 | Souissi | H04B 1/69 375/E1.001 |
| 6,141,317 | A | * | 10/2000 | Marchok | H04L 27/2657 370/207 |
| 3,121,092 | A1 | | 2/2012 | Talley et al. | |
| 10,477,367 | B2 | | 11/2019 | Blankenship et al. | |
| 10,660,151 | B2 | | 5/2020 | Futaki | |

(Continued)

FOREIGN PATENT DOCUMENTS

EP 3796323 A1 * 3/2021

OTHER PUBLICATIONS

EESR, Aug. 25, 2022, from related EP App. No. 22167656.2.

*Primary Examiner* — Siu M Lee (57) ABSTRACT

A system and method of managing network resources is provided, in which a noise threshold for an access node is set, the access node being configured for communication in both of a first and a second communication mode; a noise parameter in a band of the first communication mode is monitored; a join request is received from a wireless device, the wireless device being configured for communication in both of the first and the second communication mode; the noise parameter is compared to the noise threshold; in response to a determination that the noise parameter does not exceed the noise threshold, the wireless device is assigned to the first communication mode; and in response to a determination that the noise parameter exceeds the noise threshold, the wireless device is assigned to the second communication mode.

20 Claims, 6 Drawing Sheets

(56) References Cited

U.S. PATENT DOCUMENTS

| | | | |
|---|---|---|---|
| 11,184,900 B1* | 11/2021 | Marupaduga | H04W 24/10 |
| 2010/0316009 A1* | 12/2010 | Han | H04W 28/04 370/329 |
| 2014/0016526 A1* | 1/2014 | Ratasuk | H04W 72/1205 370/296 |
| 2015/0334656 A1* | 11/2015 | Ji | H04W 52/02 370/252 |
| 2017/0325251 A1 | 11/2017 | Sadek | |
| 2019/0253100 A1 | 8/2019 | Liu et al. | |
| 2020/0252809 A1* | 8/2020 | Patil | H04W 72/121 |
| 2021/0060244 A1 | 3/2021 | Bazargan et al. | |

\* cited by examiner

DYNAMIC RAT AND LAYER MANAGEMENT ASSIGNMENT FOR DUAL-CAPABLE IOT DEVICES

TECHNICAL BACKGROUND

A wireless network, such as a cellular network, can include an access node (e.g., a base station) serving multiple wireless devices or user equipment (UE) in a geographical area covered by a radio frequency transmission provided by the access node. Different carriers or carrier divisions within the cellular network may utilize different types of radio access technologies (RATs). RATs can include, for example, 3G RATs such as Global System for Mobile Communications (GSM), Code-Division Multiple Access (CDMA), etc.; 4G RATs such as Worldwide Interoperability for Microwave Access (WiMAX), Long Term Evolution (LTE), etc.; and 5G RATs such as new radio (NR).

Additionally, in recent years, networks have evolved to connect using the Internet of things (IoT), which describes the network of physical objects or things that are embedded with sensors, software, and other technologies for the purpose of connecting and exchanging data with other devices and systems over the Internet. Cellular IoT is a way of connecting physical devices such as sensors to the internet by having them utilize the same mobile networks as wireless devices. In the consumer market, IoT technology is frequently utilized to equip the "smart home," including devices and appliances such as lighting fixtures, thermostats, home security systems and cameras, and other appliances which support one or more common ecosystems, and can be controlled via devices associated with that ecosystem, such as smartphones and smart speakers. Cellular IoT itself is a rapidly growing ecosystem based on 3rd Generation Partnership Project (3GPP) global standards, supported by an increasing number of mobile network providers as well as device, chipset, module, and network infrastructure vendors. Cellular IoT improves over other Low Power Wide Area (LPWA) network technologies in terms of quality of service (QoS), scalability, flexibility, and the like.

Deployment of the evolving RATs in a network provides numerous benefits. For example, newer RATs may provide additional resources to subscribers, faster communications speeds, and other advantages. However, newer technologies may also have limited range in comparison to existing technologies. To ensure consistent coverage through a wide geographic range, existing technologies are often used in combination with newer technologies. Cellular IoT applications generally use one of two technologies: narrowband IoT (NB-IoT) and Category M1 (Cat-M1), which are both 3GPP standardized technologies. The technologies address different types of use cases based on their capabilities.

NB-IoT supports devices with a bandwidth of 200 kHz. Due to its narrow bandwidth, the data rate peaks at around 250 kilobits per second (kbps). An NB-IoT carrier can be deployed even in guard-band of an LTE carrier. Exemplary use cases of NB-IoT include utility meters and sensors. NB-IoT provides advantages including low complexity, low cost, ubiquitous coverage, low data rate, and low power computing. NB-IoT may be particularly suitable for transferring small amounts of information, as it uses only a narrow band. With extreme coverage capability, NB-IoT may be used to support very low data rate applications in extremely challenging radio conditions.

Cat-M1 operates at 1.4 MHz bandwidth with higher device complexity/cost than NB-IoT. The wider bandwidth allows Cat-M1 to achieve greater data rates (up to 1 megabit per second (Mbps)), lower latency, and more accurate device positioning capabilities. Cat-M1 supports voice calls and connected mode mobility. Exemplary use cases for Cat-M1 include connected vehicles, wearable devices, trackers, and alarm panels. Cat-M1 devices can exist in a sleep mode for extended periods of time, which greatly reduces device power consumption.

Certain network operators provide services via multiple RATs simultaneously. For example, a network operator may provide both NB-IoT and Cat-M1 services simultaneously. Devices are accepted and served by the network as either NB-IoT or Cat-M1 devices depending on a device request. Some IoT devices are capable of supporting both NB-IoT and Cat-M1 RATs. If such devices are not allocated with the network capabilities and/or network performance in mind, performance degradation in one or more IoT bands or frequencies may introduce inefficiencies, negatively impact device or network performance, and/or otherwise result in a reduced user experience. Thus, there exists a need for systems and methods for leveraging such capability to provide service efficiently; for example, by dynamically assigning devices to a particular RAT (such as NB-IoT) based on characteristics such as noise.

Overview

Various aspects of the present disclosure relate to systems and methods of managing network resources.

In one exemplary aspect of the present disclosure, a method of managing network resources comprises: setting a noise threshold for an access node, wherein the access node is configured for communication in both of a first communication mode and a second communication mode; monitoring a noise parameter in a band of the first communication mode; receiving a join request from a wireless device, wherein the wireless device is configured for communication in both of the first communication mode and the second communication mode; comparing the noise parameter to the noise threshold; in response to a determination that the noise parameter does not exceed the noise threshold, assigning the wireless device to the first communication mode; and in response to a determination that the noise parameter exceeds the noise threshold, assigning the wireless device to the second communication mode.

In another exemplary aspect of the present disclosure, a system for managing network resources comprises: an access node including communication circuitry configured for communication in both of a first communication mode and a second communication mode, and at least one electronic processor configured to perform operations including: setting a noise threshold for the access node, monitoring a noise parameter in a band of the first communication mode, receiving a join request from a wireless device, wherein the wireless device is configured for communication in both of the first communication mode and the second communication mode, comparing the noise parameter to the noise threshold, in response to a determination that the noise parameter does not exceed the noise threshold, assigning the wireless device to the first communication mode, and in response to a determination that the noise parameter exceeds the noise threshold, assigning the wireless device to the second communication mode.

In another exemplary aspect of the present disclosure, a method of managing network resources comprises: setting a first noise threshold and a second noise threshold for an access node, wherein the access node is configured for communication in both of a first communication mode and a second communication mode, the first noise threshold corresponds to the first communication mode, and the second noise threshold corresponds to the second communication mode; monitoring a first noise parameter in a band of the first communication mode; receiving a join request from a wireless device, wherein the wireless device is configured for communication in both of the first communication mode and the second communication mode; comparing the first noise parameter to the first noise threshold; in response to a determination that the first noise parameter does not exceed the first noise threshold, assigning the wireless device to the first communication mode; and in response to a determination that the first noise parameter exceeds the first noise threshold: comparing the second noise parameter to the second noise threshold, in response to a determination that the second noise parameter does not exceed the second noise threshold, assigning the wireless device to the second communication mode, and in response to a determination that the second noise parameter exceeds the second noise threshold, assigning the wireless device to the first communication mode.

In this manner, these and other aspects of the present disclosure provide for improvements in at least the technical field of telecommunications, as well as the related technical fields of network management, device management, wireless communications, and the like.

This disclosure can be embodied in various forms, including hardware or circuits controlled by computer-implemented methods, computer program products, computer systems and networks, user interfaces, and application programming interfaces; as well as hardware-implemented methods, application specific integrated circuits, field programmable gate arrays, and the like. The foregoing summary is intended solely to provide a general idea of various aspects of the present disclosure, and does not limit the scope of the disclosure in any way.

BRIEF DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, schematics, and system configurations. It will be readily apparent to one skilled in the art that these specific details are merely exemplary and not intended to limit the scope of this application.

In accordance with various aspects of the present disclosure, a cellular or wireless network may be provided by an access node. The access node may utilize one or more antennas to communicate with wireless devices or UEs. As the number of simultaneous wireless devices with which an access node communicates increases, so too does resource usage. In one example, consider a scenario in which a network operator is serving both LTE and Cat-M1 (e.g., with six common physical resource blocks within a host LTE cell) and NB-IoT (e.g., with a dedicated 200 kHz carrier in guardband/standalone mode) and in which an IoT device capable of supporting both Cat-M1 and NB-IoT technologies is trying to access either the operator's Cat-M1 cell or the operator's NB-IoT cell to send small packets of data. During times of performance degradation (e.g., due to high noise in one of the IoT bands or frequencies), this IoT device may be assigned to a comparatively noisy RAT when assignment to the other RAT would result in better performance, thus impacting user experience. In such a scenario, the capability of the IoT device to communicate using multiple RATs has not been leveraged in assigning the IoT device to a particular RAT, when assign to another RAT could have saved battery life, etc.

Thus, various aspects of the present disclosure may operate in an IoT cellular network utilizing multiple RATs, such as NB-IoT and Cat-M1. By providing a system and method to dynamically assign a RAT and manage a layer of IoT devices which support both NB-IoT and Cat-M1 (e.g., based on noise characteristics), the present disclosure may improve the overall performance of NB-IoT and Cat-M1 devices, may improve the battery usage parameters of the IoT devices, improve overall cell resource utilization, and so on.

In practical implementations, noise is present in the IoT cellular network. Noise may be introduced by several sources, including but not limited to environmental conditions, temporary changes in the operating conditions of an access node, interference between different connected wireless devices, interference caused due to external nodes operating in adjacent bands, and so on. Noise may be measured using different representations, including but not limited to signal-to-noise-plus-interference ratio (SINR) and reverse noise rise (RNR). SINR represents the value of a signal divided by the sum interference and background noise. RNR represents a metric of the uplink environment in cellular systems. It is defined as the noise rise due to out-of-cell emissions of adjacent cellular systems or uplink noise from the in-band operating devices. Typically in a high-RNR cellular system, the increase in the noise rise naturally translates to a decrease in the SINR. It also translates to an increase in the signal-to-noise ratio (SNR) required to maintain certain coverage contours or certain data rates.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include a UE or end-user wireless device that communicates with the access node directly without being relayed by a relay node.

Additionally, "wireless device" may encompass any type of wireless device, such as sensors that may be connected to a network as an IoT device.

Examples described herein may include at least an access node (or base station), such as an Evolved Node B (eNodeB) or a next-generation Node B (gNodeB), and one or a plurality of end-user wireless devices; however, the present disclosure is not limited to such a configuration. Various aspects of the present disclosure may also be applied to communication between an end-user wireless device and other network resources, such as relay nodes, controller nodes, antennas, and so on. Moreover, multiple access nodes may be utilized. For example, some wireless devices in the network may communicate with an LTE eNodeB, while others may communicate with an NR gNodeB.

In addition to the particular systems and methods described herein, the operations described herein may be implemented as computer-readable instructions or methods, and a processing node or nodes on the network for executing the instructions or methods. The processing node or nodes may include a processor included in the access node and/or a processor included in any controller node in the wireless network that is coupled to the access node.

Embodiments disclosed herein operate in a network supporting NB-IoT, which is configured for a high volume of low-complexity devices. NB-IoT can effectively serve devices in challenging radio environments such as deep building or underground radio signal penetration. UEs can be specifically configured with a chipset supporting NB-IoT. Further, embodiments supposed herein operate in a network supporting Cat-M1, which is also supported by devices having a particular chipset. Cat-M1 supports lower data-rate applications and is appropriate for low-power sensing and monitoring devices such as health and fitness wearables, utility meters, and vending machines, tracking, and other applications. Cat-M1 offers a lower bandwidth than most cellular services, although higher than NB-IoT applications.

Figure 1:
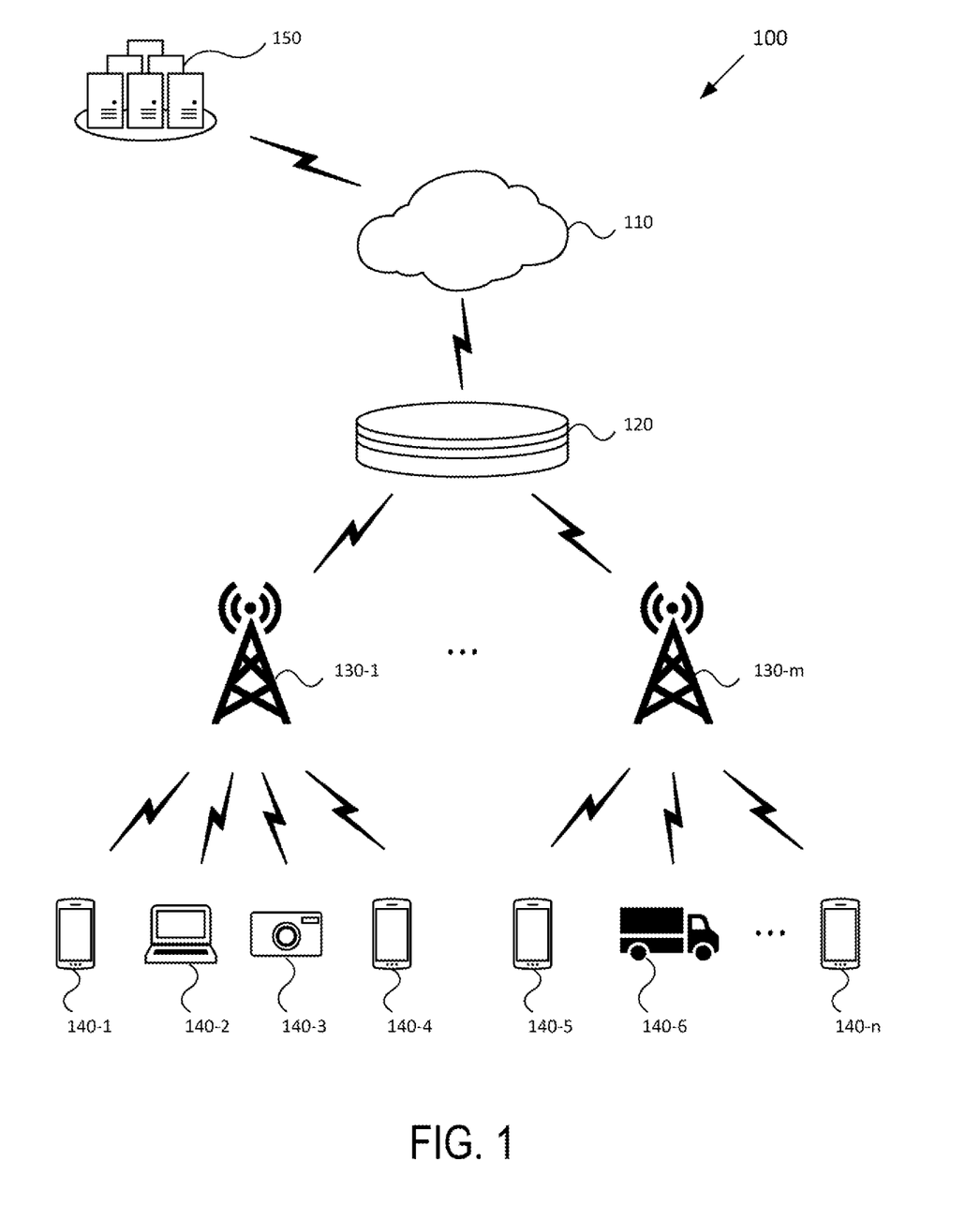
FIG. 1 illustrates an exemplary system for wireless communication in accordance with various aspects of the present disclosure.

FIG. 1 illustrates an exemplary system 100 for use with various aspects of the present disclosure. As illustrated, the system 100 includes a cloud platform 110, a core network 120, and a plurality of access nodes 130-1 to 130-$m$ (collectively referred to as access nodes 130), and a plurality of wireless devices 140-1 to 140-$n$ (collectively referred to as wireless devices 140). Other computing systems and devices 150 may be connected to the cloud platform 110, for example to monitor and/or control the wireless devices 140. While FIG. 1 illustrates only two of the access nodes 130, in practical implementations any number of the access nodes 130 (including one) may be present in the system 100. Moreover, while FIG. 1 illustrates seven of the wireless devices 140 and illustrates various subsets of the wireless devices 140 being connected to individual ones of the access nodes 130, the present disclosure is not so limited. In practical implementations, any number of the wireless devices 140 (including zero or one) may be present in total, and any number of such wireless devices 140 (including zero or one) may be connected to each access node 130. As illustrated, various elements of FIG. 1 are connected to one another via wireless connections; however, some of the connections may be wired connections. For example, an access node 130 may be connected to the core network via a wired connection.

The cloud platform 110, which may be an IoT cloud platform, may perform processing and forward results to the computing systems and devices 150 and/or the wireless devices 140. The core network 120, which may be an IoT core network, connects with the cloud platform 110 and the access nodes 130. Examples of the access nodes 130 will be described in more detail below with respect to FIGS. 2 and 3.

The wireless devices 140 are devices configured with appropriate technologies for connecting to the cloud platform 110. The wireless devices 140 may be or include mobile communication devices such as smartphones, laptop computers, tablet computers, and the like; vehicles such as cars, trucks, and the like; and/or low-complexity devices designed to communicate infrequently such as sensors, meters, wearables, trackers, and the like. The wireless devices 140 may be deployed in many environments, including remote and/or challenging radio environments such as the basement of a building or on a moving piece of machinery. In some implementations, the wireless devices 140 may send occasional signals for several years without a change or charge of battery. The core network 120 can collect and analyze data from sensors in the wireless devices 140 for real-time monitoring, GPS tracking, mobile route tracking, utility usage monitoring, and the like. Examples of the wireless devices 140 will be described in more detail below with respect to FIGS. 2 and 4.

One or more of the access nodes 130 and one or more of the wireless devices 140 may be configured to operate using NB-IoT and Cat-M1 RATs. NB-IoT supports ultra-low complexity devices with a narrow bandwidth of 200 kHz. Due to the narrow bandwidth, the data rate peaks at around 250 kbps. An NB-IoT carrier can be deployed in a guard-band of an LTE carrier to use a portion of the spectrum that would otherwise be unused. In-band operation allows NB-IoT to operate using one physical resource block (PRB) of an LTE carrier. Cat-M1 operates at 1.4 MHz bandwidth. Typically, Cat-M1 devices have a higher complexity and cost than NB-IoT devices. The wider bandwidth allows Cat-M1 to achieve greater data rates and lower latency, with more accurate device positioning capabilities. Cat-M1 may operate using six PRBs of the LTE carrier.

Both NB-IoT and Cat-M1 devices are capable of operating in sleep mode for extended periods of time with, for example, extended Discontinuous Reception (eDRX) and Power Saving Mode (PSM) functionalities, which greatly reduces device power consumption. Furthermore, both RATs support enhanced signal coverage per base station. With extreme coverage capability, NB-IoT may be especially used for supporting very low data rate applications in extremely challenging radio conditions. Where a device (such as a wireless device 140) is capable of operation in both NB-IoT and Cat-M1, it may be referred to as a "dual-capable" or "dual-capability" device. Dual capability may be provided by equipping the device with a chipset designed to utilize both NB-IoT and Cat-M1 RATs.

Figure 2:
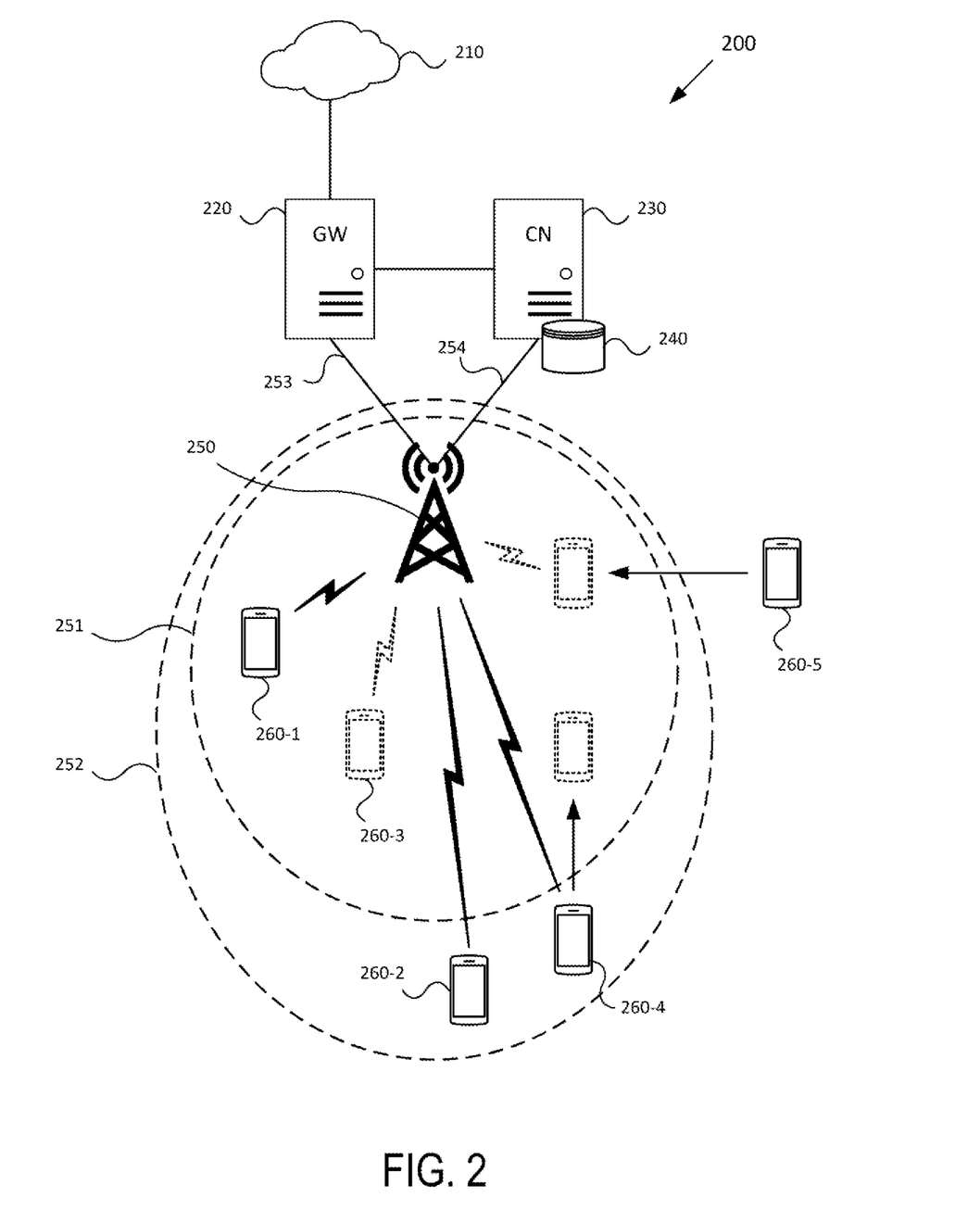
FIG. 2 illustrates an exemplary configuration of a system for wireless communication in accordance with various aspects of the present disclosure.

FIG. 2 illustrates a configuration for an exemplary system 200 in accordance with various aspects of the present disclosure. As illustrated, the system 200 comprises a communication network 210, a gateway node 220, a controller node 230 which includes a database 240, an access node 250, and a plurality of wireless devices 260-1 to 260-5 (collectively referred to as wireless devices 260). For purposes of illustration and ease of explanation, only one access node 250 is shown; however, as noted above with regard to FIG. 1, additional access nodes 250 may be present in the system 200. While five wireless devices 260 are shown for purposes of explanation, in practical implementations, any number of the wireless devices 260 (including zero or one) may be present at any given time.

The access node 250 is dual-capable, and is illustrated as having a first coverage area 251 (e.g., corresponding to a first RAT) and a second coverage area 252 (e.g., corresponding to a second RAT). In one example, the first RAT is NB-IoT and the second RAT is Cat-M1. In another example, the first RAT is Cat-M1 and the second RAT is NB-IoT. Each of the wireless devices 260 are present or may become present in one or both of the first coverage area 251 and the second coverage area 252. While the second coverage area 252 is illustrated as being larger than the first coverage area 251 for purposes of illustration and explanation, in some implementations the first coverage area 251 and the second coverage area 252 may be similarly sized. Moreover, while the first coverage area 251 is illustrated as being subsumed within the second coverage area 252, in some implementations a portion of the first coverage area 251 may be outside of the second coverage area 252. The access node 250 may provide additional coverage areas corresponding to different RATs (such as 4G and/or 5G RATs), different frequency bands, and the like.

In the illustration of FIG. 2, three wireless devices 260-1, 260-2, and 260-4 are connected to and access network services from the access node 250, with the wireless device 260-1 being located in the first coverage area 251 (and therefore also in the second coverage area 252) and with the wireless devices 260-2 and 260-4 being located in the second coverage area 252. The wireless device 260-3 is illustrated with a dotted line to show that it may become introduced into the system 200 (e.g., by powering on or waking from a sleep mode). The wireless device 260-4 may be mobile and move into the first coverage area 251, also illustrated by a dotted line. Moreover, the wireless device 260-5 is illustrated as being outside of both the first coverage area 251 and the second coverage area 252, but may enter one or both of the first coverage area 251 and the second coverage area 252 as also illustrated by a dotted line. In accordance with various aspects of the present disclosure, the access node 250 may monitor resource usage of the wireless devices 260 and dynamically assign a RAT to one or more of the wireless devices 260. One or more of the wireless devices 260 may be dual-capable.

A scheduling entity may be located within the access node 250 and/or the controller node 230, and may be configured to allocate resources and RATs to improve overall network resource utilization and performance. This may be accomplished by, for example, assigning or allocating one or more of the wireless devices 260 to particular resource blocks. For example, if the noise in the system is greater than a predetermined threshold, the scheduling entity may determine that certain resource blocks should be allocated to communication in only one RAT and that wireless devices communicating in other RATs should be restricted from accessing the certain resource blocks.

The access node 250 can be any network node configured to provide communications between the wireless devices 260 and communication network 210, including standard access nodes and/or short range, lower power, small access nodes. As examples of a standard access node, the access node 250 may be a macrocell access node, a base transceiver station, a radio base station, a gNodeB in 5G networks, an eNodeB in 4G/LTE networks, or the like. In one particular example, the access node 250 may be a macrocell access node in which a respective range of the first coverage area 251 and/or the second coverage area 252 is from approximately five to thirty-five kilometers (km) and in which the output power is in the tens of watts (W). As examples of a small access node, the access node 250 may be a microcell access node, a picocell access node, a femtocell access node, or the like, including a home gNodeB or a home eNodeB.

The access node 250 can comprise one or more processors and associated circuitry to execute or direct the execution of computer-readable instructions such as those described herein. In so doing, the access node 250 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the access node 250 can receive instructions and other input at a user interface. The access node 250 communicates with the gateway node 220 and the controller node 230 via communication links 253 and 254, respectively. The access node 250 may also communicate with other access nodes using a direct link (e.g., an X2 link or the like).

Figure 3:
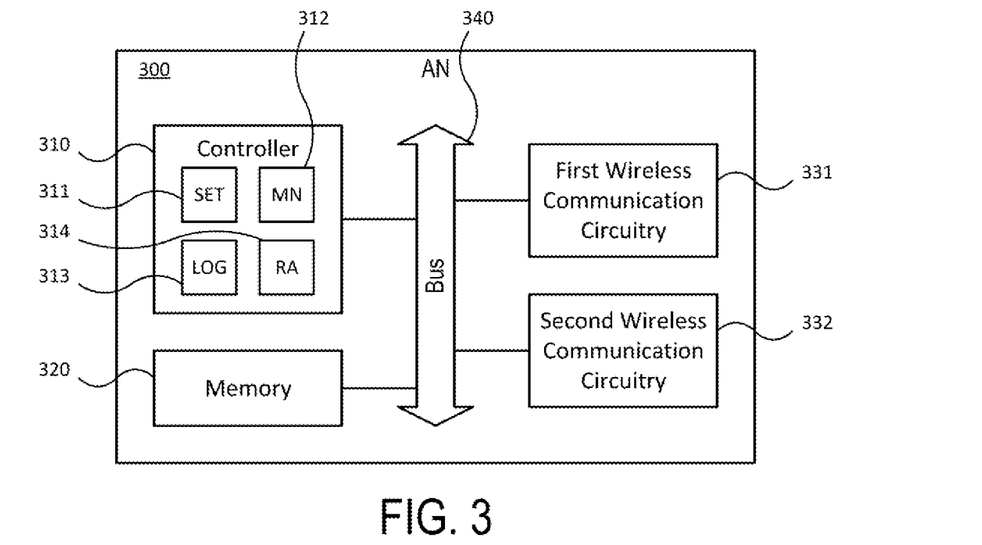
FIG. 3 illustrates an exemplary access node in accordance with various aspects of the present disclosure.

FIG. 3 illustrates one example of an access node 300, which may correspond to one or more of the access nodes 130 shown in FIG. 1 and/or the access node 250 shown in FIG. 2. As illustrated the access node 300 includes a controller 310, a memory 320, first wireless communication circuitry 331, second wireless communication circuitry 332, and a bus 340 through which the various elements of the access node 300 communicate with one another. As illustrated, the controller 310 includes sub-modules or units, each of which may be implemented via dedicated hardware (e.g., circuitry), software modules which are loaded from the memory 320 and processed by the controller 310, firmware, and the like, or combinations thereof.

The, the access node 300 may implement a system and/or method to dynamically assign a RAT and/or provide layer management to wireless devices seeking to join a network associated with the access node 300. In one example as illustrated in FIG. 3, the controller 310 includes a setting unit 311, which may be configured to set at least one noise threshold for the access node 300; a monitoring unit 312, which may be configured to monitor at least one noise parameter (e.g., RNR) of the access node 300 corresponding to at least one band or channel of at least one communication mode (e.g., Cat-M1 and/or NB-IoT); a logic unit 313, which may be configured to compare the noise parameter(s) to the noise threshold(s); and a RAT assignment unit 314, which may be configured to assign the joining wireless device to a particular RAT in response to a determination that the noise parameter(s) do or do not exceed the noise threshold(s). The setting unit 311, the monitoring unit 312, the logic unit 313, and the RAT assignment unit 314 are illustrated as residing within the controller 310 for ease of explanation; however, one or more of the units may instead reside within the memory 320 and/or may be provided as separate units within the access node 300. Moreover, while the setting unit 311, the monitoring unit 312, the logic unit 313, and the RAT assignment unit 314 are illustrated as separate units, in practical implementations some or all of the units may be combined and/or share components.

The first wireless communication circuitry 331 and/or the second wireless communication circuitry 332 may respectively include circuit elements configured to generate wireless signals (e.g., one or more antennas) as well as interface elements configured, for example, to translate control signals from the controller 310 into data signals for wireless output. While FIG. 3 illustrates the first wireless communication circuitry 331 and the second wireless communication circuitry 332 as separate elements, some or all of the components may be shared between the first wireless communication circuitry 331 and the second wireless communication circuitry 332. The access node 300 may include additional wireless communication circuitry elements, for example to communicate using RATs other than the first communication mode and the second communication mode. The access node 300 may be configured to transmit commands via one or both of the first wireless communication circuitry 331 and the second wireless communication circuitry 332. For example, the access node 300 may be configured to transmit a network command to a wireless device (e.g., to the wireless devices 140 or 260), thereby causing the wireless device to join the network in a particular RAT.

Returning to FIG. 2, the wireless devices 260 may respectively be any device, system, combination of devices, or other such communication platform capable of communicating wirelessly with access node 250 using one or more frequency bands deployed therefrom; for example, a band dedicated to NB-IoT technology and/or a Cat-M1 band. The wireless devices 260 may respectively be, for example and without limitation, a mobile phone, a wireless phone, a wireless modem, a personal digital assistant (PDA), a voice over internet protocol (VoIP) phone, a voice over packet (VoP) phone, a voice over new radio (VoNR) device, a soft phone, a sensor, a meter, a tracking device, or other types of devices or systems which can exchange audio or data via the access node 250, including IoT devices.

Figure 4:
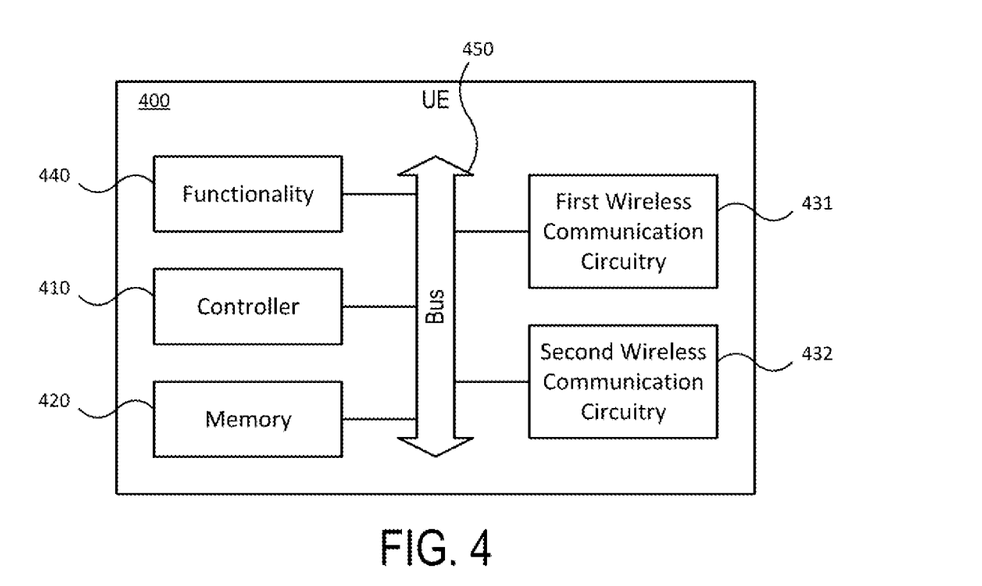
FIG. 4 illustrates an exemplary user equipment in accordance with various aspects of the present disclosure.

FIG. 4 illustrates one example of a wireless device 400 (i.e., a UE), which may correspond to one or more of the wireless devices 140 shown in FIG. 1 and/or one or more of the wireless devices 260 shown in FIG. 2. As illustrated the wireless device 400 includes a controller 410, a memory 420, first wireless communication circuitry 431, second wireless communication circuitry 432, a functionality component 440, and a bus 450 through which the various elements of the wireless device 400 communicate with one another. The functionality component 440 includes circuitry or other elements depending on the functionality of the wireless device 400. For example, if the wireless device 400 is a utility meter, the functionality component 440 may include one or more sensors. Moreover, if the wireless device 400 is a tracking device, the functionality component 440 may be a GPS tracker. The functionality component 440 may also be or include a user interface through which the wireless device 400 receives instructions and other input.

The first wireless communication circuitry 431 and/or the second wireless communication circuitry 432 may respectively include circuit elements configured to generate wireless signals (e.g., one or more antennas) as well as interface elements configured, for example, to translate control signals from the controller 410 into data signals for wireless output. While FIG. 4 illustrates the first wireless communication circuitry 431 and the second wireless communication circuitry 432 as separate elements, some or all of the components may be shared between the first wireless communication circuitry 431 and the second wireless communication circuitry 432. The wireless device 400 may include additional wireless communication circuitry elements, for example to communicate using RATs other than the first communication mode and the second communication mode. The controller 410 may be configured to receive, interpret, and/or respond to signals received via the first wireless communication circuitry 431, the second wireless communication circuitry 432, and/or the additional wireless communication circuitry elements. For example, the controller 410 may be configured to receive a network command (e.g., from an access node such as the access nodes 130, 250, or 300) and, in response thereto, to join the network in a particular RAT or to switch from one RAT to another.

Returning to FIG. 2, the communication network 210 can be a wired and/or wireless communication network, and can comprise processing nodes, routers, gateways, and physical and/or wireless data links for carrying data among various network elements, including combinations thereof, and can include a local area network (LAN) or a wide area network (WAN), and an internetwork (including the Internet). The communication network 210 can be capable of carrying data, for example to support voice, push-to-talk (PTT), broadcast video, and/or data communications by the wireless devices 260. Wireless network protocols can comprise Multimedia Broadcast Multicast Services (MBMS), CDMA, 1×RTT, GSM, UMTS, High Speed Packet Access (HSPA), Evolution-Data Optimized (EV-DO), EV-DO rev. A, 3GPP LTE, WiMAX, 4G including LTE Advanced and the like, and 5G including 5G NR or 5G LTE, or combinations thereof. Wired network protocols that may be utilized by the communication network 210 comprise Ethernet, Fast Ethernet, Gigabit Ethernet, Local Talk (e.g., Carrier Sense Multiple Access with Collision Avoidance), Token Ring, Fiber Distributed Data Interface (FDDI), and Asynchronous Transfer Mode (ATM). The communication network 210 may also comprise additional base stations, controller nodes, telephony switches, internet routers, network gateways, computer systems, communication links, other types of communication equipment, and combinations thereof.

The communication links 253 and 254 may respectively use various communication media, such as air, space, metal, optical fiber, other signal propagation paths, and combinations thereof. The communication links 253 and 254 may respectively be wired or wireless and use various communication protocols such as Internet, Internet protocol (IP), LAN, optical networking, hybrid fiber coax (HFC), telephony, T1, other communication formats, and combinations, improvements, or variations thereof. Wireless communication links may use electromagnetic waves in the radio frequency (RF), microwave, infrared (IR), or other wavelength ranges, and may use a suitable communication protocol, including but not limited to MBMS, CDMA, 1×RTT, GSM, UMTS, HSPA, EV-DO, EV-DO rev. A, 3GPP LTE, WiMAX, 4G including LTE Advanced and the like, and 5G including 5G NR or 5G LTE, or combinations thereof. The communication links 253 and 254 may respectively be a direct link or might include various equipment, intermediate components, systems, and networks. The communication links 253 and 254 may comprise many different signals sharing the same link.

The gateway node 220 may be any network node configured to interface with other network nodes using various protocols. The gateway node 220 can communicate user data over the system 200. The gateway node 220 may be a standalone computing device, computing system, or network component, and can be accessible by, for example, a wired or wireless connection, or through an indirect connection such as via a computer network or communication network. The gateway node 220 may include but is not limited to a serving gateway (SGW) and/or a public data network gateway (PGW). Additionally or alternatively, the gateway node 220 may include user plane network functions (NFs), such as a User Plane Function (UPF). The gateway node 220 is not limited to any specific technology architecture, such as LTE or 5G NR, but may be used with any network architecture and/or protocol.

The gateway node 220 can comprise a processor and associated circuitry to execute or direct the execution of computer-readable instructions to obtain information. In so doing, the gateway node 220 can retrieve and execute software from storage, which can include a disk drive, a flash drive, memory circuitry, or some other memory device, and which may be local or remotely accessible. The software may comprise computer programs, firmware, or some other form of machine-readable instructions, and may include an operating system, utilities, drivers, network interfaces, applications, or some other type of software, including combinations thereof. Moreover, the gateway node 220 can receive instructions and other input at a user interface.

The controller node 230 may be any network node configured to communicate and/or control information over the system 200. The controller node 230 may be configured to transmit control information associated with resource usage thresholds and/or usage parameters. The controller node 230 may be a standalone computing device, computing system, or network component, and can be accessible by, for example, a wired or wireless connection, or through an indirect connection such as via a computer network or communication network. The controller node 230 may include but is not limited to a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, and the like. Additionally or alternatively, the controller node 230 may comprise user plane NFs and/or control plane NFs, including but not limited to a Core Access and Mobility Management Function (AMF), an Authentication Server Function (AUSF), a Unified Data Management (UDM), a Session Management Function (SMF), a Policy Control Function (PCF), an Application Function (AF), a Network Exposure Function (NEF), a NF Repository Function (NRF), a Network Slice Selection Function (NSSF), a Short Message Service Function (SMSF), and the like. The controller node 230 is not limited to any specific technology architecture, such as LTE or 5G NR, but may be used with any network architecture and/or protocol.

The controller node 230 can comprise a processor and associated circuitry to execute or direct the execution of computer-readable instructions to obtain information. In so doing, the controller node 230 can retrieve and execute software from storage, which can include a disk drive, a flash drive, memory circuitry, or some other memory device, and which may be local or remotely accessible. As illustrated in FIG. 2, the controller node 230 includes the database 240 for storing information, such as predetermined resource usage thresholds utilized for dynamically managing RATs of the wireless devices 260, as well as positions and/or characteristics of the wireless devices 260. The database 240 may further store handover thresholds, scheduling schemes, and resource allocations for the access node 250, the wireless devices 260, and so on. This information may be requested or shared with the access node 250 via the communication link 254, X2 connections, and the like. The software may comprise computer programs, firmware, or some other form of machine-readable instructions, and may include an operating system, utilities, drivers, network interfaces, applications, or some other type of software, including combinations thereof. Moreover, the controller node 230 can receive instructions and other input at a user interface.

Other network elements may be present in system 200 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g., between the access nodes 250 and communication network 210.

Devices or systems in accordance with various aspects of the present disclosure may perform various operations to dynamically determine access to or allocation of common resource blocks. Exemplary methods including these operations are illustrated in FIGS. 5-8. The methods of FIGS. 5-8 may be triggered by various events, and in some examples may be performed continually at predetermined intervals and/or in response to network noise characteristics. The methods of FIGS. 5-8 may be performed by, for example, the scheduling entity described above. For purposes of explanation, the methods of FIGS. 5-8 will be described as being performed in the access node 300 and as corresponding to the wireless device 400; however, this is merely exemplary and not limiting. The operations described with regard to FIGS. 5-8 assume that the wireless device 400 is in a common coverage area of the first communication mode and the second communication mode (e.g., the first coverage area 251 illustrated in FIG. 2).

Figure 5:
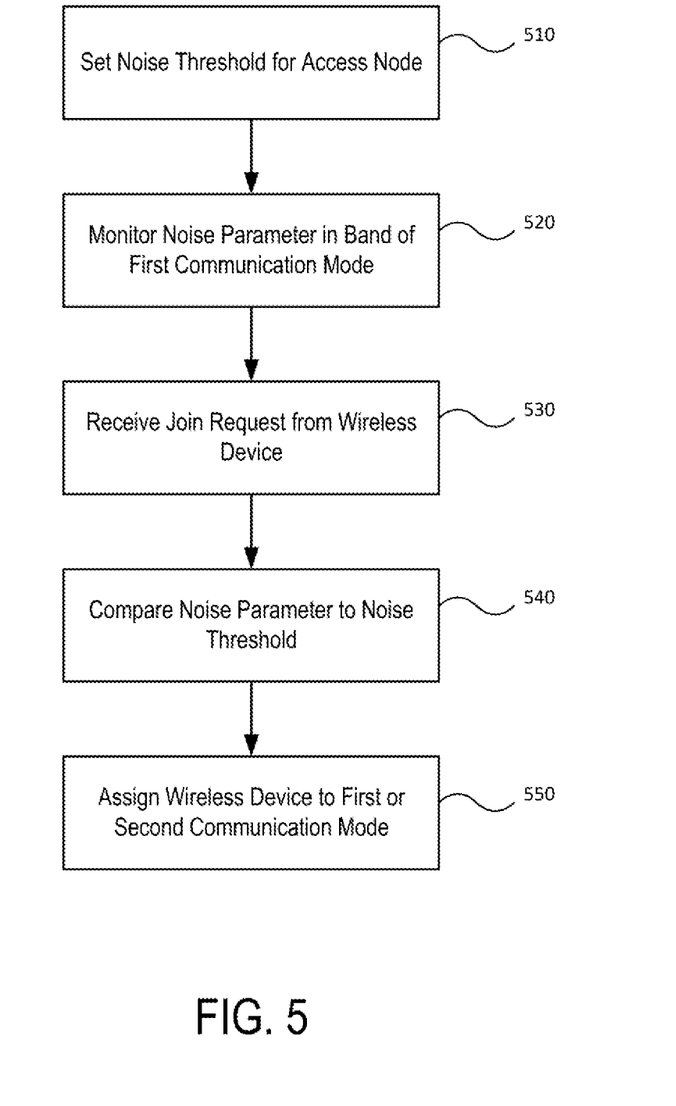
FIG. 5 illustrates an exemplary process flow for managing network resources in accordance with various aspects of the present disclosure.

FIG. 5 illustrates an exemplary method which may be performed when a dual-capable device attempts to join the network (i.e., a device assignment method). At operation 510, the access node 300 sets a noise threshold (e.g., an RNR threshold). The noise threshold may refer to a noise value above which the network is deemed to be exhibiting poor performance. The noise threshold may be predetermined by a network operator, or may be determined in response to a network status. The noise threshold may be specific to a particular frequency band or group of frequency bands of the first communication mode and/or the second communication mode, or may be a general value used for all frequency bands. The phrase "frequency band" may refer to a frequency or range of frequencies used to provide a communication channel between an access node and a connected wireless device.

At operation 520, the access node 300 monitors a noise parameter corresponding to one or more of the frequency bands in the first communication mode. The noise parameter may correspond to an instantaneous measurement of noise or may correspond to an average of the instantaneous noise over a period of time. The period of time may have a duration predetermined by the network operator. In some implementations, the noise measurement is an RNR. At operation 530, the access node receives a join request from a wireless device. In this example, the wireless device 400 is a dual-capable device as illustrated in FIG. 4, and the join request may indicate the device capabilities. At operation 540, the access node 300 compares the monitored noise parameter to the noise threshold.

Based on the comparison, at operation 550 the access node 300 assigns the wireless device 400 to the first communication mode or the second communication mode, as appropriate. If the comparison results in a determination that the noise parameter does not exceed the noise threshold, at operation 550 the access node 300 assigns the wireless device 400 to the first communication mode. If the comparison results in a determination that the noise parameter exceeds the noise threshold, at operation 550 the access node 300 assigns the wireless device 400 to the second communication mode.

In one example, the first communication mode is NB-IoT and the second communication mode is Cat-M1. In this example, if the RNR is high in a band supporting NB-IoT, any incoming dual-capable devices will be assigned to Cat-M1. In another example, the first communication mode is Cat-M1 and the second communication mode is NB-IoT. In this example, if the RNR is high in a band supporting Cat-M1, any incoming dual-capable devices will be assigned to NB-IoT.

The operations of FIG. 5 are not necessarily performed in a strict series from operation 510 to operation 550. In some implementations, the access node may perform operation 510 once for a given period of time, perform operation 520 repeatedly or continuously until a wireless device attempts to join the network, and then perform operations 530 to 550 thereafter. After the wireless device has been appropriately assigned (e.g., operation 550 has occurred), the access node may return to operation 520 without resetting the resource usage threshold.

Figure 6:
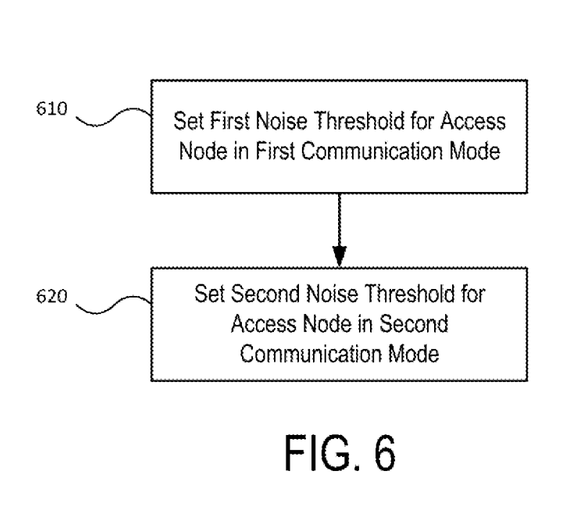
FIG. 6 illustrates another exemplary process flow for managing network resources in accordance with various aspects of the present disclosure.
Figure 7:
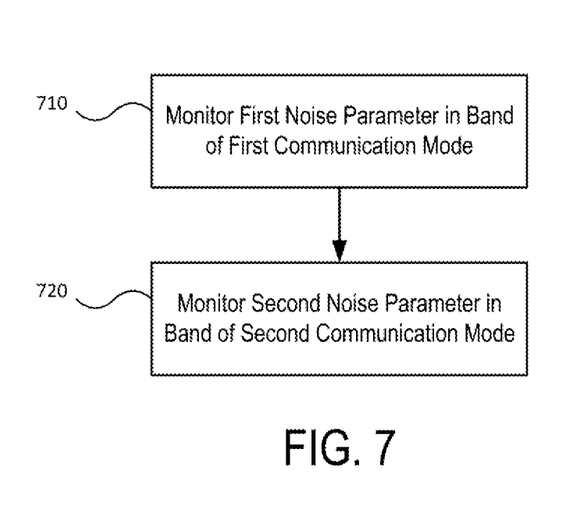
FIG. 7 illustrates another exemplary process flow for managing network resources in accordance with various aspects of the present disclosure.
Figure 8:
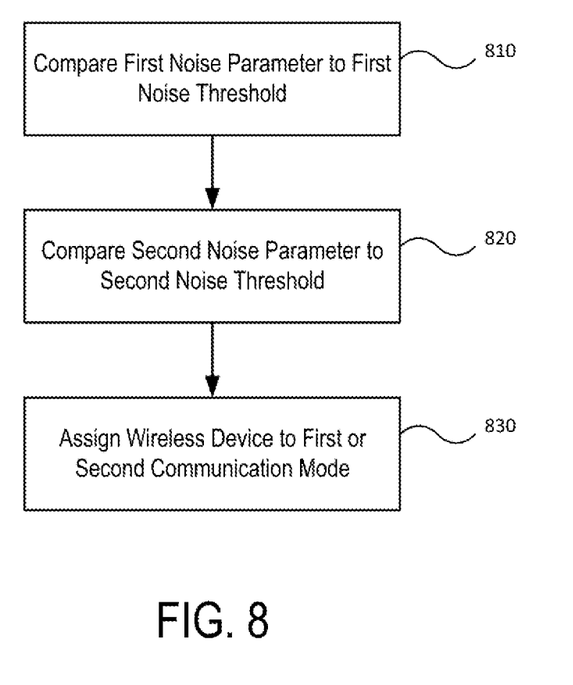
FIG. 8 illustrates another exemplary process flow for managing network resources in accordance with various aspects of the present disclosure.

While FIG. 5 illustrates an example in which the noise threshold and noise parameter of only one communication mode are considered, the present disclosure is not so limited. In some implementations, the noise characteristics of both communication modes may be considered. FIGS. 6-8 illustrate exemplary methods which may be performed in place of particular operations of FIG. 5 to thereby incorporate both communication modes. FIG. 6 illustrates an exemplary method which may be performed in place of operation 510 of FIG. 5, FIG. 7 illustrates an exemplary method which may be performed in place of operation 520 of FIG. 5, and FIG. 8 illustrates an exemplary method which may be performed in place of operations 540 and 550 of FIG. 5.

The method of FIG. 6 sets respective noise thresholds for both of the first communication mode and the second communication mode. At operation 610, the access node 300 sets a first noise threshold (e.g., a first RNR threshold) corresponding to the first communication mode. The first noise threshold may refer to a noise value above which the first communication mode is deemed to be exhibiting poor performance. At operation 620, the access node 300 sets a second noise threshold (e.g., a second RNR threshold) corresponding to the second communication mode. As above, the second noise threshold may refer to a noise value above which the second communication mode is deemed to be exhibiting poor performance. The first noise threshold and the second noise threshold may be the same as one another or may be different. One or both of the first noise threshold and the second noise threshold may be predetermined by a network operator, or may be determined in response to a network status. The respective noise thresholds may be specific to a particular frequency band or group of frequency bands of the first communication mode and/or the second communication mode, or may be a general value used for all frequency bands. While FIG. 6 illustrates operation 620 following operation 610, the order of operations may be reversed.

The method of FIG. 7 monitors respective noise parameters for both of the first communication mode and the second communication mode. At operation 710, the access node 300 monitors a first noise parameter corresponding to one or more of the frequency bands in the first communication mode. At operation 720, the access node 300 monitors a second noise parameter corresponding to one or more of the frequency bands in the second communication mode. The respective noise parameters may correspond to an instantaneous measurement of noise or may correspond to an average of the instantaneous noise over a period of time.

The period of time may have a duration predetermined by the network operator. In some implementations, the noise measurement is an RNR. While FIG. 7 illustrates operation 720 following operation 710, the order of operations may be reversed.

The method of FIG. 8 is capable of basing device assignment on both of the first and second noise parameters and thresholds, and may follow receipt of a join request from the wireless device 400 similar to operation 520 of FIG. 5. At operation 810, the access node 300 compares the monitored first noise parameter to the first noise threshold. At operation 820, the access node 300 compares the monitored second noise parameter to the second noise threshold. Based on the comparison, at operation 830 the access node 300 assigns the wireless device 400 to the first communication mode or the second communication mode, as appropriate.

For example, if the first noise parameter exceeds the first noise threshold and the second noise parameter does not exceed the second noise threshold, at operation 830 the access node 300 may assign the wireless device 400 to the second communication mode. In contrast, if the first noise parameter does not exceed the first noise threshold and the second noise parameter exceeds the second noise threshold, at operation 830 the access node 300 may assign the wireless device 400 to the first communication mode. If the first noise parameter exceeds the first noise threshold and the second noise parameter exceeds the second noise threshold, at operation 830 the access node 300 may assign the wireless device 400 to a default communication mode selected from among the first communication mode and the second communication mode.

Alternatively, if the first noise parameter exceeds the first noise threshold and the second noise parameter exceeds the second noise threshold, at operation 830 the access node 300 may determine which communication mode is exhibiting less noise and assign the wireless device 400 to the less-noisy communication mode. This may be accomplished by, for example, determining whether the first noise parameter exceeds the first noise threshold by a larger amount than the second noise parameter exceeds the second noise threshold (or vice versa), determining whether the first noise parameter is larger than the second noise parameter (or vice versa), and so on.

In some implementations, only one of operation 810 or operation 820 may be performed. For example, if operation 810 determines that the first noise parameter does not exceed the first noise threshold, operation 820 may be omitted and at operation 830 the access node 300 may assign the wireless device to the first communication mode. In other words, the performance of operation 820 may be conditional on the result of operation 810. Additionally, the operations of FIG. 8 are not necessarily performed in the listed order, and in some examples operation 810 may instead occur after operation 820. In such examples, operation 810 may be conditional, and thus only be performed in a case where operation 820 determines that the second noise parameter exceeds the second noise threshold. Where operation 820 determines that the second noise parameter does not exceed the second noise threshold, operation 810 may be omitted and at operation 830 the access node 300 may assign the wireless device 400 to the second communication mode.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention, and are intended to be illustrative and not restrictive. Many embodiments and applications other than the examples provided would be apparent to those skilled in the art upon reading the above description. The scope should be determined, not with reference to the above description, but instead with reference to the appended claims, along with the full scope of equivalents to which such claims are entitled. It is anticipated and intended that future developments will occur in the technologies discussed herein, and that the disclosed systems and methods will be incorporated into future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, the use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of managing network resources, comprising:
    setting a noise threshold for an access node, wherein the access node is configured for communication in both of a first communication mode and a second communication mode, wherein the first communication mode and the second communication mode are Internet-of-Things (IoT) communication modes;
    monitoring a noise parameter in a band of the first communication mode;
    receiving a join request from a wireless device, wherein the wireless device is configured for communication in both of the first communication mode and the second communication mode;
    comparing the noise parameter to the noise threshold;
    in response to a determination that the noise parameter does not exceed the noise threshold, assigning the wireless device to the first communication mode; and
    in response to a determination that the noise parameter exceeds the noise threshold, assigning the wireless device to the second communication mode.

2. The method according to claim 1, wherein the noise parameter is a reverse noise rise.

3. The method according to claim 1, wherein the first communication mode is a Category M1 (Cat-M1) communication mode and the second communication mode is a Narrowband Internet-of-Things (NB-IoT) communication mode.

4. The method according to claim 1, wherein the first communication mode is a Narrowband Internet-of-Things (NB-IoT) communication mode and the second communication mode is a Category M1 (Cat-M1) communication mode.

5. The method according to claim 1, wherein the noise threshold is predetermined by a network operator.

6. The method according to claim 1, further comprising:
    after receiving the join request from the wireless device, determining whether the wireless device is located in a common coverage area of the first communication mode and the second communication mode.

7. The method according to claim 6, further comprising:
    in response to a determination that the wireless device is located in the common coverage area, performing the operation of comparing the noise parameter to the noise threshold.

8. A system for managing network resources, comprising:
    an access node including communication circuitry configured for communication in both of a first communication mode and a second communication mode, wherein the first communication mode and the second communication mode are Internet-of-Things (IoT) communication modes, and
    at least one electronic processor configured to perform operations including:
        setting a noise threshold for the access node,
        monitoring a noise parameter in a band of the first communication mode,
        receiving a join request from a wireless device, wherein the wireless device is configured for communication in both of the first communication mode and the second communication mode,
        comparing the noise parameter to the noise threshold,
        in response to a determination that the noise parameter does not exceed the noise threshold, assigning the wireless device to the first communication mode, and
        in response to a determination that the noise parameter exceeds the noise threshold, assigning the wireless device to the second communication mode.

9. The system according to claim 8, wherein the noise parameter is a reverse noise rise.

10. The system according to claim 8, wherein the first communication mode is a Category M1 (Cat-M1) communication mode and the second communication mode is a Narrowband Internet-of-Things (NB-IoT) communication mode.

11. The system according to claim 8, wherein the first communication mode is a Narrowband Internet-of-Things (NB-IoT) communication mode and the second communication mode is a Category M1 (Cat-M1) communication mode.

12. The system according to claim 8, wherein the noise threshold is predetermined by a network operator.

13. The system according to claim 8, wherein the at least one electronic processor is configured to assign the wireless device to the first communication mode or to the second communication mode by transmitting a network command to the wireless device.

14. The system according to claim 8, wherein the at least one electronic processor is further configured to, after receiving the join request from the wireless device, determine whether the wireless device is located in a common coverage area of the first communication mode and the second communication mode.

15. The system according to claim 14, wherein the at least one electronic processor is further configured to, in response to a determination that the wireless device is located in the common coverage area, perform the operation of comparing the noise parameter to the noise threshold.

16. A method of managing network resources, comprising:
   setting a first noise threshold and a second noise threshold for an access node, wherein the access node is configured for communication in both of a first communication mode and a second communication mode, the first noise threshold corresponds to the first communication mode, and the second noise threshold corresponds to the second communication mode;
   monitoring a first noise parameter in a band of the first communication mode;
   monitoring a second noise parameter in a band of the second communication mode;
   receiving a join request from a wireless device, wherein the wireless device is configured for communication in both of the first communication mode and the second communication mode;
   comparing the first noise parameter to the first noise threshold;
   in response to a determination that the first noise parameter does not exceed the first noise threshold, assigning the wireless device to the first communication mode; and
   in response to a determination that the first noise parameter exceeds the first noise threshold:
      comparing the second noise parameter to the second noise threshold,
      in response to a determination that the second noise parameter does not exceed the second noise threshold, assigning the wireless device to the second communication mode, and
      in response to a determination that the second noise parameter exceeds the second noise threshold, assigning the wireless device to the first communication mode.

17. The method according to claim 16, wherein the first noise parameter is a first reverse noise rise and the second noise parameter is a second reverse noise rise.

18. The method according to claim 16, wherein the first communication mode is one of a Category M1 (Cat-M1) communication mode or a Narrowband Internet-of-Things (NB-IoT) communication mode, and the second communication mode is the other of the Cat-M1 communication mode or the NB-IoT communication mode.

19. The method according to claim 16, wherein the first noise threshold and/or the second noise threshold are predetermined by a network operator.

20. The method according to claim 16, further comprising:
   after receiving the join request from the wireless device, determining whether the wireless device is located in a common coverage area of the first communication mode and the second communication mode.

* * * * *